Feb. 14, 1950 S. J. H. BREUKEL 2,497,392
SETTLER
Filed Dec. 31, 1946
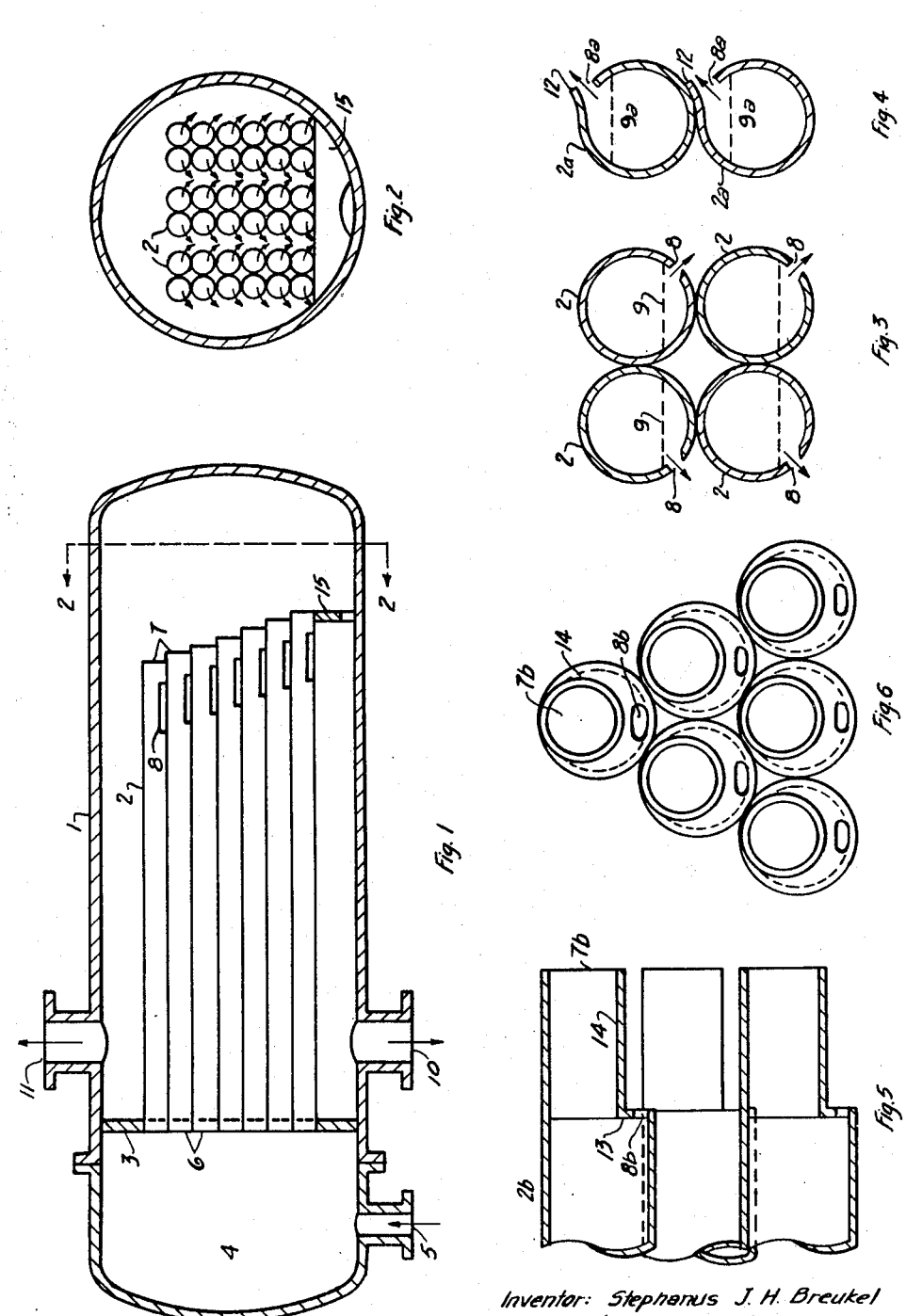
Inventor: Stephanus J. H. Breukel
By: Oswald H. Milmore
His Attorney Patented Feb. 14, 1950

2,497,392

UNITED STATES PATENT OFFICE 2,497,392

SETTLER

Stephanus J. H. Breukel, Delft, Netherlands, assignor to Shell Development Company, San Francisco, Calif., a corporation of Delaware Application December 31, 1946, Serial No. 719,395
In the Netherlands April 9, 1946

10 Claims. (Cl. 210—51)

This invention relates to improvements in settlers for separating immiscible liquids of different specific gravities by means of gravity. It is particularly concerned with a tube settler in which a shell or kettle contains a plurality of parallel tubes, dispersed either horizontally or at a slight incline, through which the emulsion of liquids flows and within which they are separated.

In the separation of such liquids from their emulsion by gravity it has heretofore been proposed to divide the shell into a number of smaller, enclosed settling zones by means of trays or tubes. The dimensions of the component settling zones are chosen so as to cause resulting laminar flow and a stratification of the liquids near the discharge ends of the zones. The two liquid layers are discharged into the shell and the lighter and heavier liquids move upwards and downwards, respectively. A difficulty of such settlers has been that the ascending and descending discharged liquids are commingled, resulting in partial remixing, which lessens the efficiency of the settler.

It has also been proposed, e. g., in U. S. Patent No. 2,375,590, to provide passages interconnecting the component settling zones to permit one liquid to flow through successive settling zones. A difficulty with such a device is that, after settling, one liquid must flow against the current of the other, resulting in turbulence.

It is an object of this invention to provide an improved tube settler in which the liquids are settled while flowing in the same direction through a plurality of tubes, and are discharged at different outlets, disposed to minimize subsequent remixing of the liquids.

It is a further object to provide an improved arrangement of the tubes in the shell of a tube settler to facilitate the flow of the separated liquids within the shell after their discharge from the tubes.

These and other objects will be understood from the following detailed description, taken together with the annexed drawings, in which:

Fig. 1 is a detailed sectional elevational view showing one preferred embodiment of the invention;

Fig. 2 is a sectional view taken on line 2—2 of Fig. 1;

Fig. 3 is an enlarged sectional view showing the intermediate outlet on one of the tubes in the embodiment according to Fig. 1;

Fig. 4 is a view similar to Fig. 3 showing a modified form of tube; and

Figs. 5 and 6 are elevation and end views, respectively, of another modified arrangement of the tubes.

In accordance with my invention the deleterious commingling of the separated liquids is prevented by providing separate outlets for the two liquids discharged from the settling tubes. This is achieved by providing an intermediate outlet near to but in advance of the final outlet of each tube to permit one of the liquids to be discharged in any direction, such as upwards or downwards or to the side of the tube, or in a direction parallel to the axis of the tube. Preferably the liquid constituting the smaller part of the mixture is discharged through the intermediate outlet. Thus the liquid present in the greater proportion leaves the tube at the final outlet coaxially with the tube, while the smaller part of the mixture is discharged just before reaching the final outlet and can collect separated from the other part.

In the drawing, I is a shell or kettle containing a number of settling tubes 2, preferably arranged in double vertical banks as shown in Fig. 2. The outlet ends rest on perforated supporting baffle 15. The inlet ends of the tubes are connected to a bulkhead or partition wall 3, which separates a compartment 4 from the main part of the shell. The emulsion of liquids to be separated is fed into the compartment 4 via inlet 5. The space 4 and bulkhead 3 serve as a manifold, permitting the feed emulsion to be distributed into the several tubes.

The tubes 2 are disposed substantially horizontally, i. e., either truly horizontally or at a slight upward or downward slope. In the embodiment shown in Fig. 1, there is a slight downward slope from the inlet ends 6 to the final outlet ends 7. A short distance from the final outlet 7, each tube is provided with a lateral intermediate outlet 8, located in the lower half of the tube. As shown in Figs. 2 and 3, the outlets are located laterally to discharge the heavier liquid, the level of which is indicated by the dashed line 9, sideways, away from the vertical center plane of the double bank of tubes. The heavy liquid thus flows into the spaces between the double banks of tubes and into the spaces between the wall of the shell and the flank banks of tubes. This heavy liquid collects at the bottom of the shell and is withdrawn at outlet 10.

The lighter liquid is discharged at the final outlets 7, flowing mainly along the center line of the tube, and is collected separately from the heavier liquid. To aid still further in this separate collection the lengths of the tubes are preferably such that each tube extends horizontally at least as far as vertically beneath the tubes above it. In this manner the descending flow of the heavier liquid from the intermediate outlets is kept in the space between the inlet ends of the tubes and the final outlet ends and out of the path of flow of the ascending lighter liquid. In the preferred embodiment shown in the drawing the upper tubes are actually shortened to insure unimpeded flow. The lighter liquid collects at the top of the shell and is withdrawn at outlet 11.

When the lighter liquid constitutes the smaller part of the mixture it will be preferable to discharge it transversely through the intermediate outlets. Such an arrangement is illustrated in Fig. 4. This figure also illustrates a modified arrangement for nesting the tubes, by bending part of the pipe 2a to form a guide lip 12 and provide an opening 8a. The level of the heavier liquid is shown at 9a. When the lighter liquid is thus discharged through the intermediate openings it is preferable to shorten the lower tubes and extend the upper ones, (i. e., as if Fig. 1 were inverted) so that the descending heavier liquid, discharged from the final outlets, will not commingle with the rising lighter liquid.

The objects of my invention may also be achieved by blocking the final outlet either at the top by means of a dependent blocking structure resembling a herse or at the bottom, by means of an upstanding blocking structure resembling a sill, depending upon whether the lighter or the heavier liquid, respectively, is to be discharged through the intermediate outlet. This embodiment is illustrated in Figs. 5 and 6, which show the blocking of the lower portion of the tube. 2b is a portion of the settling tube, provided with a final outlet 7b. The intermediate outlet 8b is provided in the sill 13. This sill obstructs the flow of the heavier liquid, which is discharged through the outlet 8b. The final outlet 7b is elevated and the lighter liquid flows through the narrowed portion 14 of the tube. This arrangement permits the tubes to be closely serried, as shown in Fig. 6, enough space being left between the round, narrowed end portions 14 of the tubes to allow the heavier liquid to flow downwards without encroaching upon the space beyond the final outlets 7b in which the upward flow of the lighter liquid takes place. The shortening of the upper pipes shown in Fig. 1 and described above is desirable also with this embodiment.

When it is desired to discharge the lighter liquid through the intermediate outlet the tubes shown in Figs. 5 and 6 are inverted, the obstruction 13 in this case functioning as a herse.

The settler described in this specification may be used, for example, in solvent extraction processes, and for the separation of mineral oil emulsions, including emulsions resulting from acid treatments.

I claim as my invention:

1. A tube settler for separating immiscible liquids of different specific gravities comprising a shell, a plurality of substantially horizontal settling tubes within said shell, manifold means for distributing an emulsion of liquids into said tubes at inlet points, each of said tubes being provided with a final outlet for discharging one of said liquids and with an intermediate outlet near said final outlet disposed to permit the other of said liquids to leave the tube between the inlet and the final outlet without back-flow against the current of said one liquid, said outlets discharging into a common space within said shell and said inlet and intermediate outlet being spaced apart to permit settling of the liquids while flowing through the tubes, and means for separately withdrawing the separated liquids from said common space within the shell.

2. The tube settler according to claim 1 in which each tube is provided at its final outlet with a partial obstruction at the level of the liquid to be discharged at the intermediate outlet, to block the discharge of said liquid through the final outlet.

3. The tube settler according to claim 1 in which the tubes are closely serried and each tube is provided with a partial obstruction at the level of the liquid to be discharged through the intermediate outlet, the intermediate outlet is an opening through said obstruction, and the portion of the tube between the intermediate outlet and the final outlet is of reduced outside diameter so as to provide space between adjacent tubes for the flow of liquid discharged through the intermediate outlets.

4. A tube settler for separating immiscible liquids of different specific gravities comprising a shell, a plurality of substantially horizontal settling tubes within said shell, manifold means for distributing an emulsion of liquids into said tubes at the inlet ends thereof, each of said tubes being provided with a final outlet opening at the end remote from the inlet end for discharging one of said liquids into a space within the shell and with an intermediate opening near the final outlet opening disposed to permit the other of said liquids to be discharged into said space within the shell before reaching said final opening without back-flow against the current of said one liquid, said inlet and intermediate outlet being spaced apart to permit settling of the liquids while flowing through the tubes, and outlets near the top and bottom of the shell for withdrawing the settled liquids from said space.

5. A tube settler for separating immiscible liquids of different specific gravities comprising a shell, a plurality of parallel, substantially horizontal settling tubes at different levels within said shell, manifold means for distributing an emulsion of liquids into the inlet ends of said tubes, each of said tubes being provided with a final outlet at the end remote from said inlet end for discharging the lighter liquid into a space within said shell and with an intermediate opening near the final outlet disposed to permit the heavier liquid to be discharged into said space within the shell before reaching the final outlet without back-flow against the current of said lighter liquid, said inlet ends and intermediate outlets being spaced apart to permit settling of the liquids while flowing through the tubes, each tube being long enough to extend at least as far as vertically beneath any higher tube, whereby descending flow of heavier liquid is kept within the portion of said space situated between the inlet ends and the final outlets of the tubes, and outlets near the top and bottom of the shell for withdrawing the settled liquids from said space.

6. The tube settler according to claim 5 wherein the final outlet of each tube is disposed beyond a point vertically beneath the final outlet of any adacent higher tube in a direction away from the inlet end.

7. The tube settler according to claim 5 in which the tubes are inclined slightly downwardly from their inlet ends toward their final outlets.

8. A tube settler for separating immiscible liquids of different specific gravities comprising a shell, a plurality of parallel, substantially horizontal settling tubes at different levels within said shell, manifold means for distributing an emulsion of liquids into the inlet ends of said tubes, each of said tubes being provided with a final outlet at the end remote from said inlet end for discharging the heavier liquid into a space within said shell and with an intermediate opening near the final outlet disposed to permit the lighter liquid to be discharged into said space within the shell before reaching the final outlet without back-flow against the current of said heavier liquid, said inlet ends and intermediate outlets being spaced apart to permit settling of the liquids while flowing through the tubes, each tube being long enough to extend at least as far as vertically beneath any lower tube, whereby ascending flow of lighter liquid is kept within the portion of said space situated between the inlet ends and the final outlets of the tubes, and outlets near the top and bottom of the shell for withdrawing the settled liquids from said space.

9. The tube settler according to claim 5 wherein the final outlet of each tube is disposed beyond a point vertically beneath the final outlet of any adjacent lower tube in a direction away from the inlet end.

10. A tube settler for separating immiscible liquids of different specific gravities comprising a shell, a plurality of substantially horizontal settling tubes within said shell arranged in double vertical banks leaving a vertical space between adjacent double banks, manifold means for distributing an emulsion of liquids into said tubes at the inlet ends thereof, each of said tubes being provided with a final outlet opening at the end remote from the inlet end for discharging one of said liquids into a space within said shell and with an intermediate opening near the final outlet opening disposed to permit the other of said liquids to be discharged into said space within the shell before reaching said final opening, the intermediate openings in each double bank of tubes being located to discharge the liquid away from the vertical center plane of the bank, said inlet and intermediate outlet being spaced apart to permit settling of the liquids while flowing through the tubes, and outlets near the top and bottom of the shell for withdrawing the settled liquids from said space.

STEPHANUS J. H. BREUKEL.

REFERENCES CITED

The following references are of record in the file of this patent:

UNITED STATES PATENTS

| Number | Name | Date |
| --- | --- | --- |
| 1,496,090 | Marker et al. | June 3, 1924 |
| 1,690,537 | Hele-Shaw et al. | Nov. 6, 1928 |
| 1,804,743 | Cannon | May 12, 1931 |
| 1,864,911 | Jodeck | June 28, 1932 |
| 1,868,775 | Stratford | July 26, 1932 |
| 1,873,597 | Jones | Aug. 23, 1932 |
| 1,943,367 | Champion | Jan. 16, 1934 |
| 2,104,050 | Nibecker et al. | Jan. 4, 1938 |
| 2,229,732 | Goldsmith | Jan. 28, 1941 |
| 2,375,590 | Schoenberg et al. | May 8, 1945 |